United States Patent
Ananthanarayanan et al.

(10) Patent No.: US 6,875,944 B2
(45) Date of Patent: Apr. 5, 2005

(54) METHOD FOR RESISTANCE WELDING/ BRAZING A TUBE TO A CONTAINER

(75) Inventors: Venkatasubramanian Ananthanarayanan, Beavercreek, OH (US); Dharmendra M. Ramachandra, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 10/430,854

(22) Filed: May 6, 2003

(65) Prior Publication Data

US 2004/0222194 A1 Nov. 11, 2004

(51) Int. Cl.[7] .............................................. B23K 11/00
(52) U.S. Cl. ...................... 219/76.16; 219/59.1; 219/61
(58) Field of Search ............................. 219/59.1, 60 R, 219/61, 78.16, 101, 102, 104

(56) References Cited

U.S. PATENT DOCUMENTS

| | | | |
|---|---|---|---|
| 4,480,166 A | | 10/1984 | Leech |
| 4,676,427 A | * | 6/1987 | Constance .................. 228/189 |
| 5,386,923 A | | 2/1995 | Nakashima et al. |
| 6,287,513 B1 | | 9/2001 | Grady et al. |
| 6,390,124 B1 | | 5/2002 | Kido et al. |
| 6,539,837 B2 | | 4/2003 | Fanelli et al. |
| 6,552,294 B1 | * | 4/2003 | Ananthanarayanan et al. ... 219/107 |
| 6,586,110 B1 | | 7/2003 | Obeshaw |
| 6,615,488 B2 | | 9/2003 | Anders et al. |
| 6,623,048 B2 | | 9/2003 | Castel et al. |
| 2003/0196715 A1 | | 10/2003 | Sakamoto et al. |

FOREIGN PATENT DOCUMENTS

| | | |
|---|---|---|
| JP | 55-136584 | 10/1980 |
| JP | 08-193577 | 7/1996 |

* cited by examiner

Primary Examiner—Kiley S. Stoner
Assistant Examiner—Len Tran
(74) Attorney, Agent, or Firm—Michael D. Smith

(57) ABSTRACT

A method for resistance welding/brazing a tube to a container. A tube is obtained having an axially-extending first portion and a tube form which extends transversely from the first portion. A container is obtained having an orifice. A support tool is obtained with an expandable head. The tube form is positioned proximate the outer surface of the container and surrounding the orifice. The unexpanded head of the support tool is passed through the orifice of the container. The head of the support tool is expanded inside the container. The inner surface of the container is supported with the expanded head of the support tool. A resistance current path is created through the tube form and the container creating a weld/braze zone which includes at least some of the tube form and at least some of the container.

20 Claims, 4 Drawing Sheets

METHOD FOR RESISTANCE WELDING/BRAZING A TUBE TO A CONTAINER

TECHNICAL FIELD

The present invention relates generally to welding and brazing, and more particularly to a method for resistance welding/brazing a tube to a container.

BACKGROUND OF THE INVENTION

Resistance welding (also known as electric-resistance welding) is a known metallurgical process used to weld a right-angle end flange of a tube to a surface projection of a plate wherein metal is heated by its own resistance to a semi-fused (i.e., soft) or fused (i.e., molten) state by the passage of very heavy electric currents for very short lengths of time and then welded. In one known variation, the plate is stamped creating depressions on the top surface and creating surface projections on the bottom surface so that during the resistance welding, the projections soften and/or melt creating a weld nugget which joins together the plate to the tube flange.

Conventional methods for welding a tube to a container, wherein the tube is to become an inlet and/or outlet tube of the container, include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire usually at a positive electrical welding potential and with the parts electrically grounded. The welding arc creates a molten weld puddle which results in the welding together of the parts. Gas metal arc welding requires expensive welding equipment, the molten weld puddle tends to flow away from the joint area depending on joint position with respect to gravity resulting in welds of inconsistent quality, and the process requires a long cycle time between welds.

Conventional methods for attaching parts together also include friction welding. To join a tube to a thick-walled container, wherein the tube is to become an inlet and/or outlet tube of the container, the tube is rotated about its longitudinal axis, and the tube end and the container are pressed together, wherein friction causes heating creating the weld. Friction welding a tube to a thin-walled container, if possible at all, would distort the shape of the container due to head and pressure. Friction welding requires expensive welding equipment, and the process requires a long cycle time between welds. It is noted that laser and electron-beam welding for the above joints also need expensive equipment and expensive joint preparation.

Conventional brazing is a known metallurgical process used to join together two metal members. In this method, a brazing material is interposed between the two members, and external heat is applied to the assemblage which bonds the brazing material to the two members. A brazing flux or a reducing braze furnace atmosphere is also used. Typically, a batch of assemblages of member pairs with interposed brazing material is heated in an oven or by an infrared heat source. In some applications, the members tend to become distorted from the oven or infrared heat. Conventional brazing requires expensive heating equipment and batch heat processing of the assemblages.

What is needed is a less expensive method for metallurgically joining a tube to a container.

SUMMARY OF THE INVENTION

A first method of the invention is for welding/brazing a tube to a container and includes steps a) through h). Step a) includes obtaining a tube having an axially-extending first portion and having a tube form which extends transversely from the first portion. Step b) includes obtaining a container having an outer surface, an inner surface and an orifice. Step c) includes obtaining a support tool with an expandable head having an unexpanded state and an expanded state. Step d) includes positioning the tube form proximate the outer surface of the container and surrounding the orifice. Step e) includes passing the unexpanded head of the support tool through the orifice of the container. Step f) includes expanding the head of the support tool inside the container. Step g) includes supporting the inner surface of the container with the expanded head of the support tool. Step h) includes creating a resistance current path through the tube form and the container creating a weld/braze zone which includes at least some of the tube form and at least some of the container.

A second method of the invention is for welding a tube to a container and includes steps a) through h). Step a) includes obtaining a tube having an axially-extending first portion and having a tube form which extends transversely from the first portion. Step b) includes obtaining a container having an outer surface, an inner surface and an orifice. Step c) includes obtaining a support tool with an expandable head having an unexpanded state and an expanded state. Step d) includes positioning the tube form proximate the outer surface of the container and surrounding the orifice. Step e) includes passing the unexpanded head of the support tool through the orifice of the container. Step f) includes expanding the head of the support tool inside the container. Step g) includes supporting the inner surface of the container with the expanded head of the support tool. Step h) includes creating a resistance current path through the tube form and the container and relatively axially moving the tube form deformingly toward the container creating a weld zone which includes at least some of the tube form and at least some of the container.

A third method of the invention is for brazing a tube to a container and includes steps a) through h). Step a) includes obtaining a tube having an axially-extending first portion and having a tube form which extends transversely from the first portion. Step b) includes obtaining a container having an outer surface, an inner surface and an orifice. Step c) includes obtaining a support tool with an expandable head having an unexpanded state and an expanded state. Step d) includes positioning the tube form proximate the outer surface of the container and surrounding the orifice. Step e) includes passing the unexpanded head of the support tool through the orifice of the container. Step f) includes expanding the head of the support tool inside the container. Step g) includes supporting the inner surface of the container with the expanded head of the support tool. Step h) includes creating a resistance current path through the tube form and the container and relatively axially moving the tube form deformingly toward the container creating a braze zone which includes at least some of the tube form and at least some of the container.

Several benefits and advantages are derived from one or more of the methods of the invention. The tube form and the support tool with the expandable head allow resistance welding/brazing of a tube to a container to be commercially feasible, and allow deformation resistance welding/brazing even to be possible for thin-walled containers, as can be appreciated by those skilled in the art. Resistance welding/brazing is less expensive than gas metal arc welding or friction welding or brazing using an external heat source. Resistance welding/brazing also has a shorter cycle time between welds/brazes than gas metal arc welding or friction welding or brazing using an external heat source. Resistance welding/brazing heats only the joint area of the tube and the member avoiding heat distortion of the parts in contrast to using an external heat source.

DESCRIPTION OF THE PREFERRED EMBODIMENTS

Figure 1:
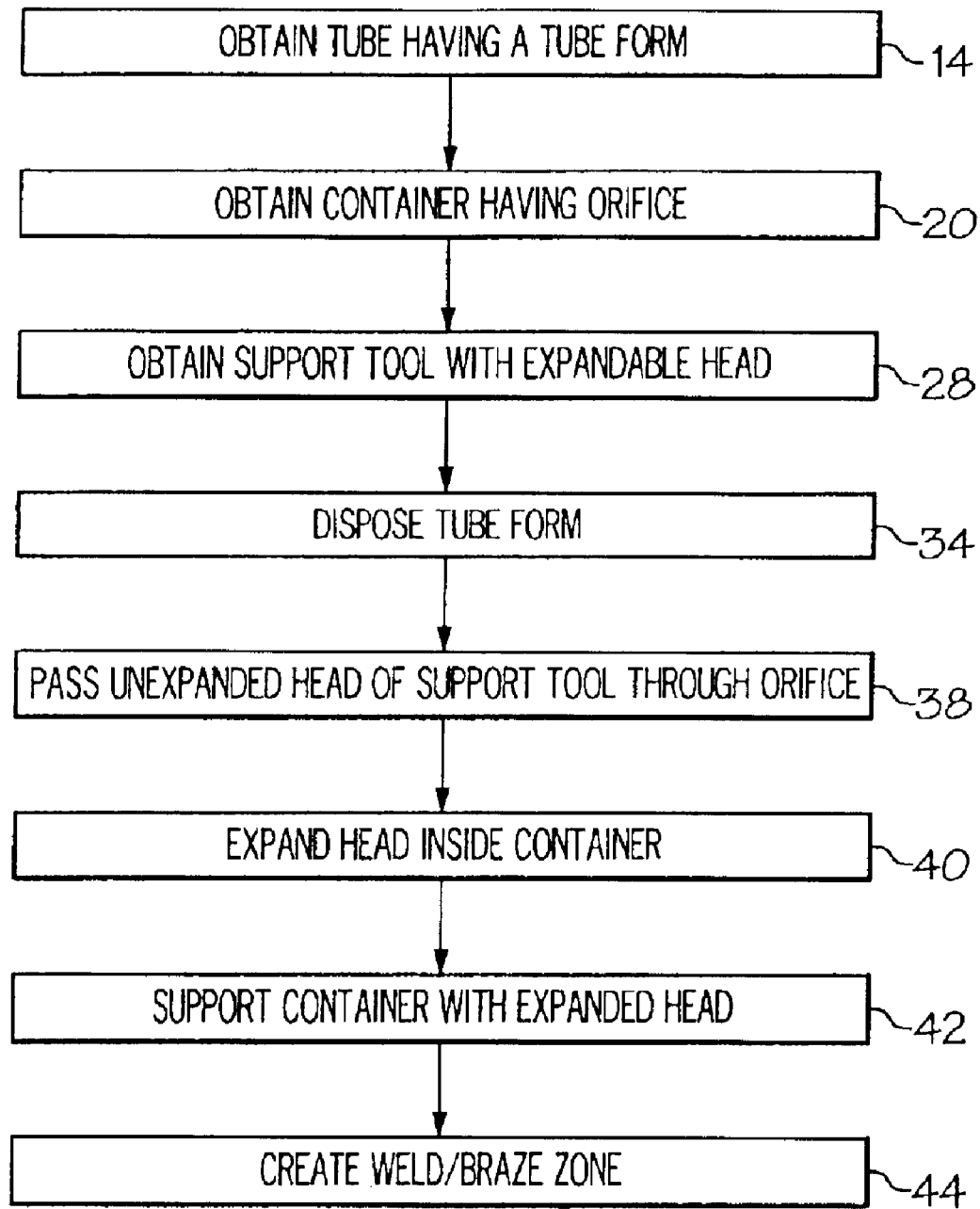
FIG. 1 is a block diagram of a first method of the invention for resistance welding/brazing a tube to a container.
Figure 2:
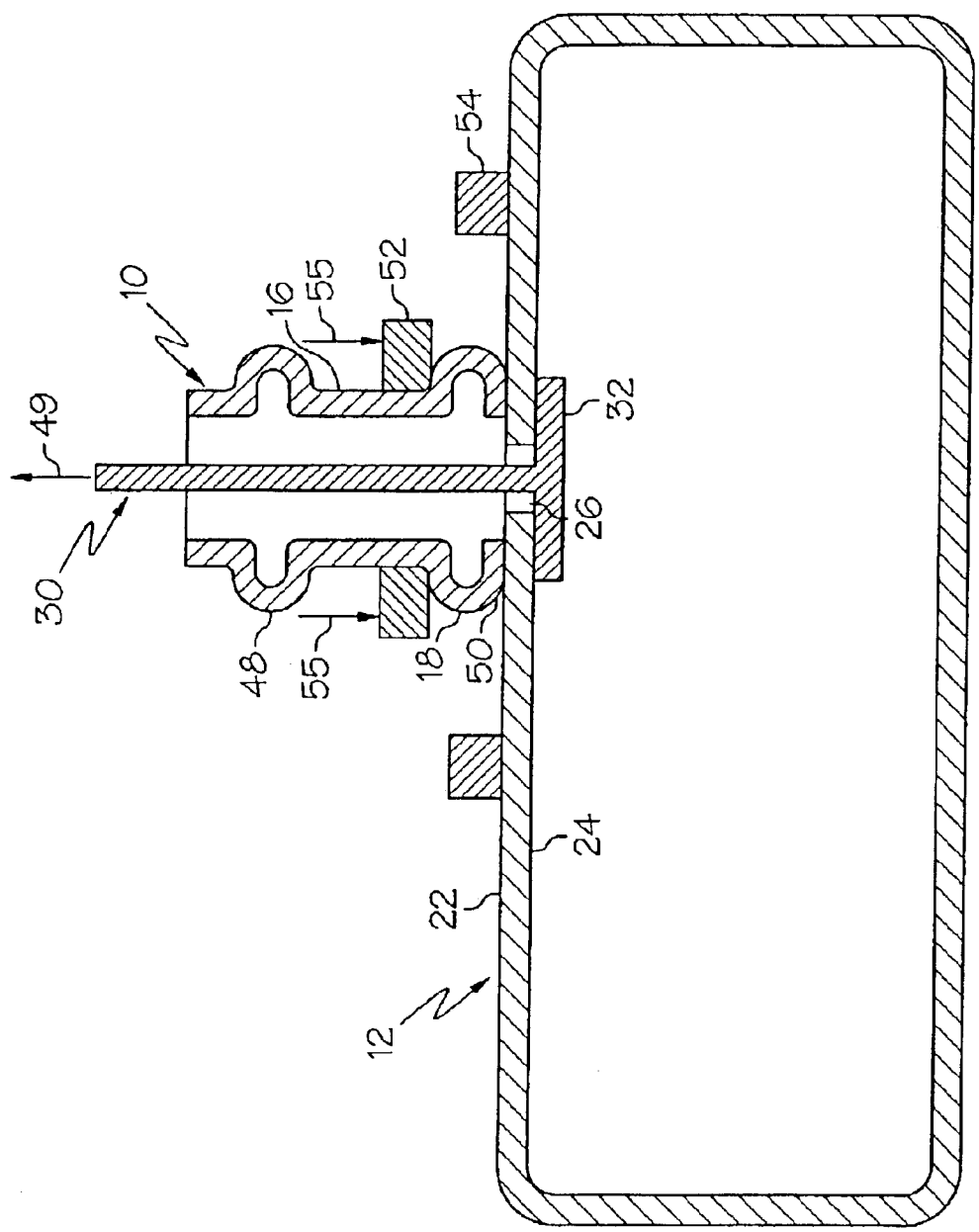
FIG. 2 is a schematic, side cross-sectional view of a first embodiment of a tube, a container and a support tool used in a welding example of the first method, showing the tube and the container just before welding.
Figure 3:
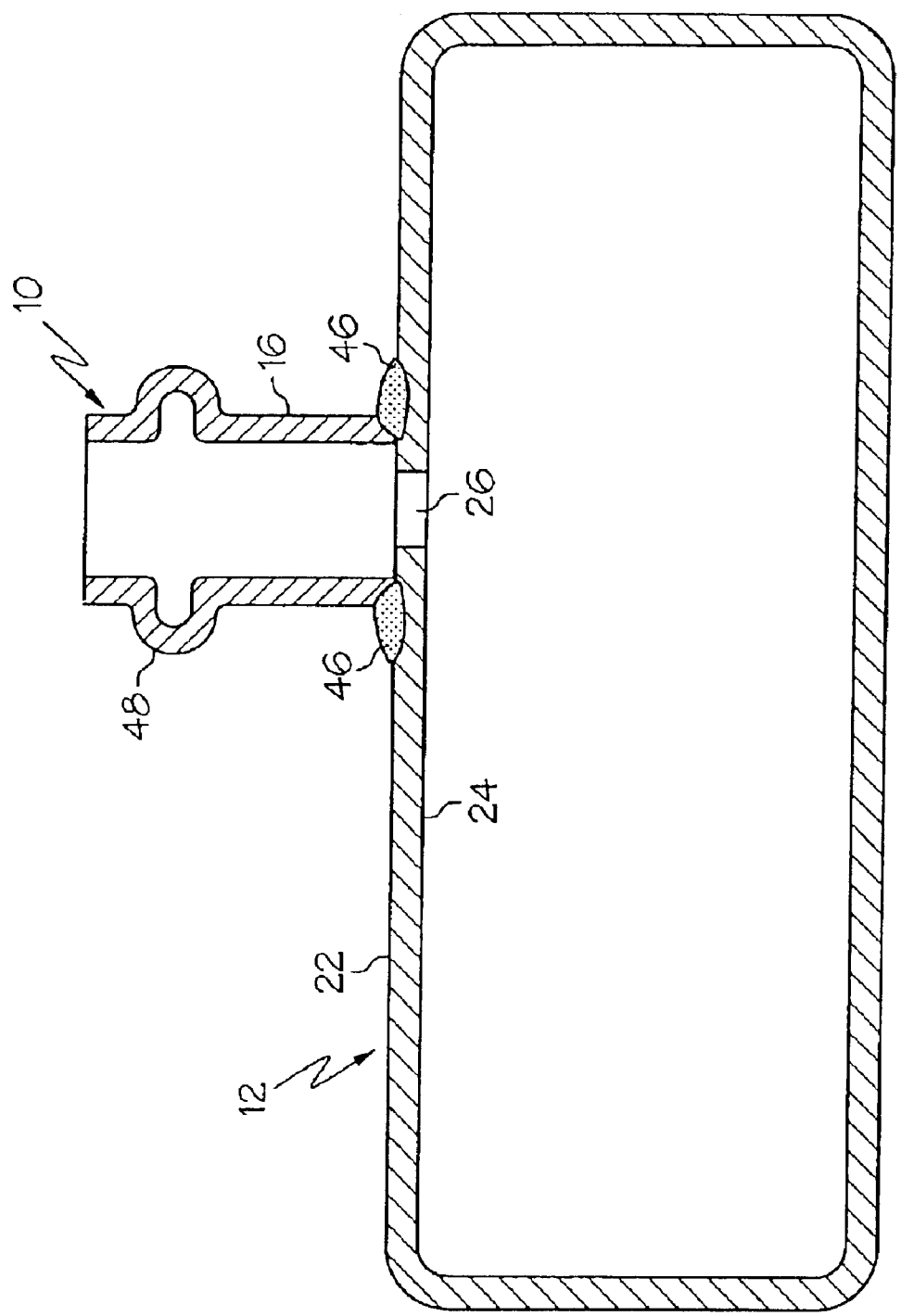
FIG. 3 is a view, as in FIG. 2, but showing the tube and the container after welding and with the welding electrodes and the support tool removed.

A first method of the invention is for welding/brazing a tube 10 to a container 12 and is shown in block diagram form in FIG. 1 with a first embodiment of the tube 10 and the container 12 shown in FIGS. 2 and 3. The first method includes steps a) through h). Step a) is labeled as "Obtain Tube Having A Tube Form" in block 14 of FIG. 1. Step a) includes obtaining a tube 10 having an axially-extending first portion 16 and having a tube form 18 which extends transversely from the first portion 16. Step b) is labeled as "Obtain Container Having Orifice" in block 20 of FIG. 1. Step b) includes obtaining a container 12 having an outer surface 22, an inner surface 24 and an orifice 26. Step c) is labeled as "Obtain Support Tool With Expandable Head" in block 28 of FIG. 1. Step c) includes obtaining a support tool 30 with an expandable head 32 having an unexpanded state and an expanded state. Step d) is labeled as "Dispose Form" in block 34 of FIG. 1. Step d) includes disposing the tube form 18 proximate the outer surface 22 of the container 12 and surrounding the orifice 26. Step e) is labeled as Pass Unexpanded Head Of Support Tool Through Orifice" in block 38 of FIG. 1. Step e) includes passing the unexpanded bead 32 of the support tool 30 through the orifice 26 of the container 12. Step f) is labeled "Expand Head Inside Container" in block 40 of FIG. 1. Step f) includes expanding the head 32 of the support tool 30 inside the container 12. Step g) is labeled as "Support Container With Expanded Head" in block 42 of FIG. 1. Step g) includes supporting the inner surface 24 of the container 12 with the expanded head 32 of the support tool 30 (such as in the example shown in FIG. 2). Step h) is labeled as "Create Weld/Braze Zone" in block 44 of FIG. 1. Step h) includes creating a resistance current path through the tube form 18 and the container 12 creating a weld/braze zone 46 which includes at least some of the tube form 18 and at least some of the container 12.

By "welding/brazing" a tube 10 to a container 12 is meant welding the tube 10 to the container 12 using or not using a filler weld material, brazing the tube 10 to the container 12 using a filler braze material, welding a portion of the tube 10 to a portion of the container 12 using or not using a filler material and brazing another portion of the tube 10 to another portion of the container 12 using the filler material, or welding a portion of a filler material to one of the tube 10 and the container 12 and brazing another portion of the filler material to the other of the tube 10 and the member 12. Examples of a "weld/braze zone 46" include a weld zone, a braze zone, and a zone having a weld zone portion and a braze zone portion. Other examples are left to the artisan.

Examples of step i) of the first method for welding/brazing a tube 10 to a container 12 include non-deformation resistance welding, deformation resistance welding, non-deformation resistance brazing and deformation resistance brazing. In non-deformation resistance welding, at least some of the tube 10 and/or at least some of the container 12 are melted by the internal heat produced during the creation of the resistance current path in step i). In deformation resistance welding, at least some of the tube 10 and/or at least some of the container 12 need only be softened (but may have at least a portion melted) by the internal heat produced during the creation of the resistance current path in step i). In non-deformation resistance brazing or deformation resistance brazing, no portion of the tube 10 and/or no portion of the container 12 is melted. Other examples are left to the artisan.

Tools having an expandable head, which can serve as the support tool 30 used in the first method, are well known in the art. For example, a tapered axially-movable shaft of a tool can be axially moved against inclined surfaces of two transversely movable members of the tool head to transversely move the members outward creating the expanded state of the head. Withdrawal of the axial shaft allows return springs to transversely move the members inward creating the unexpanded state of the head. In example, the head is rotated from a substantially axial orientation to a transverse orientation to expand the head. The direction of support for the support tool 30 in FIG. 2 is indicated by arrow 49. Other expandable-head tool designs are left to the artisan. An example of a container includes, without limitation, an enclosed container 12 having the orifice 26 with or without one or more additional orifices.

In one application of the first method, the tube 10 is a tubular connector having two ends, wherein one of the two ends includes the tube form 18, and wherein the tube 10 proximate the other of the two ends is attachable to a member (such as, without limitation, a longer tube). In one variation, the tube 10 has a second tube form 48 proximate the other of the two ends as shown in FIG. 2. It is noted that the word "proximate" includes the word "at". In one modification, the second tube form 48 is resistance welded/brazed to a tube form on a longer tube, as can be appreciated by the artisan.

In one enablement of the first method, the tube form 18 is a fold 50 as shown in FIG. 2. A "fold" is a fold of the tube wall of a portion of the tube. The fold may or may not include axially-spaced-apart first and second fold portions. In one variation, the fold is an annular fold. In one modification, the fold is an outwardly-extending annular fold. In a different enablement, the tube form 18 is a flange. For purposes of describing any of the methods, a flange is a tube form which does not include a fold. In one variation, the flange is an annular flange. In one modification, the flange is an outwardly-extending annular flange. Other annular and non-annular tube forms are left to the artisan.

In one implementation of the first method, the tube form 18 is a monolithic portion of the tube 10. In one technique, conventional tube forming methods are used to create the tube form 18 such as by surrounding the tube 10 with a die having a tube-form-shaped recess, supporting the inside of the tube 10 with a solid cylinder, and pushing against the ends of the tube 10 to force a portion of the tube 10 into the recess to create the tube form 18. In another technique, the tube 10 is created by pouring molten metal into a tube mold which is shaped to create the tube form 18. Other implementations and techniques are left to the artisan.

In one choice of the first method, the weld/braze zone 46 of step h) is a weld zone. In one variation, step d) disposes the tube form 18 in contact with the outer surface 22 of the container 12 as shown in FIG. 2. In one modification, the first method also includes the step of disposing a filler weld material (not shown) in contact with the tube form 18 and the outer surface 22 of the container 12.

In another choice of the first method, the weld/braze zone of step h) is a braze zone. Since brazing includes the use of a filler braze material (not shown), in this choice of the first method there is also included the step of disposing a filler braze material in contact with the tube form and the outer surface of the container as is understood by the artisan.

In one embodiment of the support tool, 30, the support tool 30 is an electrically-insulated support tool. In one variation, the first method also includes the steps of disposing a first electrode 52 in contact with the tube form 18 of the tube 10 and disposing a second electrode 54 in contact with the outer surface 22 of the container 12 as shown in FIG. 2. The first and second electrodes 52 and 54 can be used in a conventional resistance welding machine to perform the first method (higher electric currents would be used for welding and lower electric currents and a filler braze material would be used for brazing the same parts). In this choice, each of the first and second electrodes 52 and 54 are annular (e.g., a one or two or more piece annular) electrodes. In another embodiment, the support tool also serves the function of an electrode which is in contact with the inner surface 24 of the container 22 replacing the second electrode 54 in FIG. 2.

In one technique using the first method, step h) is performed without relatively axially moving the tube form 18 deformingly toward the container 12. In another technique, step h) includes relatively axially moving the tube form 18 deformingly toward the container 12 (along lines of movement indicated by arrows 55 in FIG. 2.). It is noted, when the welding/brazing of the first method is welding, that step h) is with or without the application of deforming pressure when the metal of the parts to be welded is melted and step h) is with the application of deforming pressure when the metal of the parts to be welded is only softened. Even when not applying deforming pressure, the tube 10 and the member 12 typically would be moved relatively toward each other to maintain the resistance welding/brazing current path during step h). By "relatively moving" a first piece toward a second piece is meant moving the first piece toward the second piece or moving the second piece toward the first piece or moving both pieces toward each other.

In one option using the first method, the weld/braze zone 30 created by step h) is a leak-tight annular weld/braze zone. In another option, the weld/braze zone 30 is not a leak-tight weld zone. A non-leak-tight weld/braze zone is satisfactory for particular welding/brazing applications as can be appreciated by the artisan.

In one deployment of the first method, the tube 10 has a chemical composition which is different from that of the container 12. In one variation, the compositions are such that the tube and the member could be resistance welded without the filler material, and in another variation, they could not. In a different deployment, the tube 10 has a chemical composition which is identical to that of the member 12. In one variation the tube 10 and the container 12 consist essentially of steel and when brazing, the filler braze material consists essentially of copper.

Figure 4:
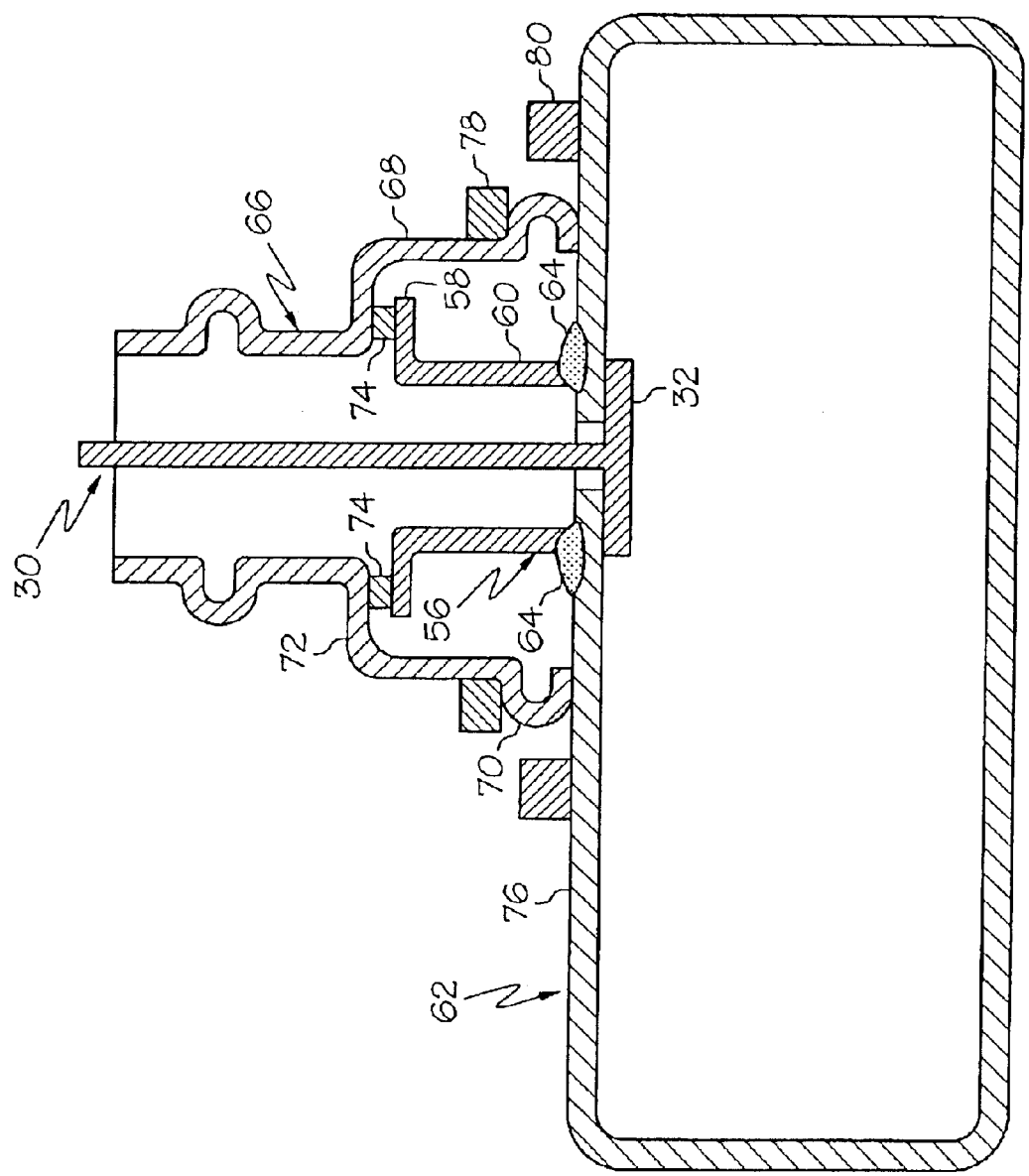
FIG. 4 is a view, as in FIG. 2, but showing a second embodiment of inner and outer tubes and a container used in a welding example of an extension of the first method, showing the tubes and the container with the inner tube already welded to the container and just before welding the outer tube to the container.

In one extension of the first method, the tube 10 of FIG. 2 of the first method is an inner tube 56 (shown in FIG. 4) having an additional tube form 58 which extends transversely from the first portion 60. In this extension, the inner tube 56 has been welded/brazed to the container 62 at the weld/braze zone 64 in accordance with steps a) through h) of the first method. In one example, the inner tube 56 is identical to tube 10 of FIG. 2 except that the additional tube form 58 of the inner tube 56 is a flange (and not another fold as with tube 10 of FIG. 2). In this extension, the first method also includes several additional steps. One additional step is obtaining an outer tube 66 including an axially-extending tube portion 68 having a first end with an outer tube form 70 which extends transversely from the tube portion 68 and having a second end with a shoulder 72 which extends transversely from the tube portion 68. Another additional step includes obtaining a compressible seal 74 (such as an "O" ring seal). Another additional step includes disposing the outer tube 66 and the seal 74 with the outer tube 66 surrounding the inner tube 56, with the outer tube form 70 proximate the outer surface 76 of the container 62, with the shoulder 72 of the outer tube 66 proximate the additional tube form 58 of the inner tube 56, and with the seal 74 between and in contact with the shoulder 72 of the outer tube 66 and the additional tube form 58 of the inner tube 56. Another additional step includes creating a resistance current path through the outer tube form 70 and the container 62 creating an outer weld/braze zone which includes at least some of the outer tube form 70 and at least some of the container 62. This creates a dual-walled joint providing a redundant seal as can be appreciated by those skilled in the art. In one example, first and second electrodes 78 and 80 are positioned to weld/braze the outer tube 66 to the container 62 as shown in FIG. 4.

A second method of the invention is identical to the first method except that the tube 10 is welded to the container 12 creating a weld zone in step h) and except that step h) includes relatively axially moving the tube form 18 deformingly toward the container 12. A third method of the invention is identical to the first method but is limited to brazing the tube 10 to the member 12 creating a braze zone in step h) and except that step h) includes relatively axially moving the tube form 18 deformingly toward the container 12. The third method would use a filler braze material as is understood by those skilled in the art. In one variation of either or both of the second and third methods, the container 12 would be deformed in step h) without the use of the support tool 30 in step g).

Several benefits and advantages are derived from one or more of the methods of the invention. The tube form and the support tool with the expandable head allow resistance welding/brazing of a tube to a container to be commercially feasible, and allow deformation resistance welding/brazing even to be possible for thin-walled containers, as can be appreciated by those skilled in the art. Resistance welding/ brazing is less expensive than gas metal arc welding or friction welding or brazing using an external heat source. Resistance welding/brazing also has a shorter cycle time between welds/brazes than gas metal arc welding or friction welding or brazing using an external heat source. Resistance welding/brazing heats only the joint area of the tube and the member avoiding heat distortion of the parts in contrast to using an external heat source.

The foregoing description of several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for welding/brazing a tube to a container comprising the steps of:
   a) obtaining a tube having an axially-extending first portion and having a tube form which extends transversely from the first portion;
   b) obtaining a container having an outer surface, an inner surface and an orifice;
   c) obtaining a support tool with an expandable head having an unexpanded state and an expanded state;
   d) disposing the tube form proximate the outer surface of the container and surrounding the orifice;
   e) passing the unexpanded head of the support tool through the orifice of the container;
   f) expanding the head of the support tool inside the container;
   g) supporting the inner surface of the container with the expanded head of the support tool; and
   h) creating a resistance current path through the tube form and the container creating a weld/braze zone which includes at least some of the tube form and at least some of the container.

2. The method of claim 1, wherein the tube is a tubular connector having two ends, wherein one of the two ends includes the tube form, and wherein the tube proximate the other of the two ends is attachable to a member.

3. The method of claim 1, wherein the tube form is a fold.

4. The method of claim 3, wherein the fold is an outwardly-extending annular fold.

5. The method of claim 1, wherein the tube form is a flange.

6. The method of claim 5, wherein the flange is an outwardly-extending annular flange.

7. The method of claim 1, wherein step h) is performed without relatively axially moving the tube form deformingly toward the member.

8. The method of claim 1, wherein step h) includes relatively axially moving the tube form deformingly toward the member.

9. The method of claim 1, wherein the weld/braze zone of step h) is a weld zone.

10. The method of claim 9, wherein step d) disposes the tube form in contact with the outer surface of the container.

11. The method of claim 9, also including the step of disposing a filler weld material in contact with the tube form and the outer surface of the container.

12. The method of claim 1, wherein the weld/braze zone of step h) is a braze zone.

13. The method of claim 12, also including the step of disposing a filler braze material in contact with the tube form and the outer surface of the container.

14. The method of claim 1, wherein the support tool is an electrically-insulated support tool.

15. The method of claim 1, also including the steps of disposing a first electrode in contact with the tube form of the tube and disposing a second electrode in contact with the outer surface of the container.

16. The method of claim 1, wherein the tube is an inner tube, wherein the first portion of the inner tube has an additional tube form which extends transversely from the first portion, and also including the steps of:
   obtaining an outer tube including an axially-extending tube portion having a first end with an outer tube form which extends transversely from the tube portion and having a second end with a shoulder which extends transversely from the tube portion;
   obtaining a compressible seal;
   disposing the outer tube and the seal with the outer tube surrounding the inner tube, with the outer tube form proximate the outer surface of the container, with the shoulder of the outer tube proximate the additional tube form of the inner tube, and with the seal between and in contact with the shoulder of the outer tube and the additional tube form of the inner tube; and
   creating a resistance current path through the outer tube form and the container creating an outer weld/braze zone which includes at least some of the outer tube form and at least some of the container.

17. A method for welding a tube to a container comprising the steps of:
   a) obtaining a tube having an axially-extending first portion and having a tube form which extends transversely from the first portion;
   b) obtaining a container having an outer surface, an inner surface and an orifice;
   c) obtaining a support tool with an expandable head having an unexpanded state and an expanded state;
   d) disposing the tube form proximate the outer surface of the container and surrounding the orifice;
   e) passing the unexpanded head of the support tool through the orifice of the container;
   f) expanding the head of the support tool inside the container;
   g) supporting the inner surface of the container with the expanded head of the support tool; and
   h) creating a resistance current path through the tube form and the container and relatively axially moving the tube form deformingly toward the container creating a weld zone which includes at least some of the tube form and at least some of the container.

18. The method of claim 17, wherein the container would be deformed in step h) without the use of the support tool in step g).

19. A method for brazing a tube to a container comprising the steps of:
   a) obtaining a tube having an axially-extending first portion and having a tube form which extends transversely from the first portion;
   b) obtaining a container having an outer surface, an inner surface and an orifice;
   c) obtaining a support tool with an expandable head having an unexpanded state and an expanded state;
   d) disposing the tube form proximate the outer surface of the container and surrounding the orifice;
   e) passing the unexpanded head of the support tool through the orifice of the container;

f) expanding the head of the support tool inside the container;

g) supporting the inner surface of the container with the expanded head of the support tool; and h) creating a resistance current path through the tube form and the container and relatively axially moving the tube form deformingly toward the container creating a braze zone which includes at least some of the tube form and at least some of the container.

20. The method of claim 19, wherein the container would be deformed in step h) without the use of the support tool in step g).

* * * * *